(12) United States Patent
Bornard et al.

(10) Patent No.: US 11,719,214 B2
(45) Date of Patent: Aug. 8, 2023

(54) HYDROTURBINE RUNNER CROWN WITH BALANCING SLOTS

(71) Applicant: GE Renewable Technologies, Grenoble (FR)

(72) Inventors: Laurent Bornard, St-Ours (CA); David Allan Scott, Brossard (CA); Guillaume Boutet-Blais, Lévis (CA)

(73) Assignee: GE Renewable Technologies, Grenoble (FR)

( * ) Notice: Subject to any disclaimer, the term of this patent is extended or adjusted under 35 U.S.C. 154(b) by 125 days.

(21) Appl. No.: 17/295,471

(22) PCT Filed: Nov. 20, 2019

(86) PCT No.: PCT/EP2019/081954
§ 371 (c)(1),
(2) Date: May 20, 2021

(87) PCT Pub. No.: WO2020/104536
PCT Pub. Date: May 28, 2020

(65) Prior Publication Data
US 2021/0388808 A1 Dec. 16, 2021

(30) Foreign Application Priority Data
Nov. 21, 2018 (EP) ..................................... 18306542

(51) Int. Cl.
*F03B 11/04* (2006.01)
*F03B 3/02* (2006.01)
(52) U.S. Cl.
CPC ................ *F03B 11/04* (2013.01); *F03B 3/02* (2013.01); *F05B 2260/603* (2013.01)

(58) Field of Classification Search
CPC .......... F03B 3/125; F03B 3/02; F03B 11/002; F03B 11/04; F03B 11/006; F05B 2260/602; F05B 2260/603
See application file for complete search history.

(56) References Cited

U.S. PATENT DOCUMENTS 3,239,193 A * 3/1966 Kerensky .............. F03B 11/006
415/110
3,350,059 A * 10/1967 Sproule ................. F03B 11/006
415/176

(Continued)

FOREIGN PATENT DOCUMENTS

FR 1080683 A 12/1954
JP S6050275 A 3/1985

(Continued)

OTHER PUBLICATIONS

European Search Report Corresponding to EP18306542 dated Apr. 3, 2019.

(Continued)

*Primary Examiner* — Richard A Edgar
(74) *Attorney, Agent, or Firm* — Dority & Manning, P.A.

(57) ABSTRACT

A hydraulic turbine includes a runner having a shaft, a runner crown, and a runner tip. Blades are fixed to the runner crown and are rotatable around an axis of rotation in operation of the hydraulic turbine, each blade including a leading edge and a trailing edge. A first chamber is located between the runner crown and a stationary head cover, or within head cover. A second chamber is located in the runner tip. A passage for water is defined between the first chamber and the second chamber. The runner crown has an upper portion and a lower portion, the upper portion having a larger diameter than the lower portion such that a channel is defined between the upper and lower portions. The channel (Continued)

has a circular shape and a circular symmetry around the axis of rotation and leads to a discharge region below the runner.

6 Claims, 4 Drawing Sheets

(56) References Cited

U.S. PATENT DOCUMENTS

| 5,823,740 A | 10/1998 | Cybularz et al. |
| 2012/0063889 A1 | 3/2012 | Kawajiri et al. |

FOREIGN PATENT DOCUMENTS

| JP | 2013234621 A | * | 11/2013 |
| JP | 2016056787 A | * | 4/2016 |

OTHER PUBLICATIONS

PCT International Search Report Corresponding to PCT/EP2019/081954 dated Dec. 16, 2019.

* cited by examiner

HYDROTURBINE RUNNER CROWN WITH BALANCING SLOTS

TECHNICAL FIELD AND PRIOR ART

The invention relates to the field of the hydropower industry.

More specifically, the invention relates to Francis turbines, pump-turbines or other designs that have a leakage flow. The internal structure of a known turbine is illustrated in FIG. 1.

It comprises blades 2 (of which only one is represented on FIG. 1), which can rotate around an axis XX'. Each blade has a leading edge 8 and a trailing edge 10. Water flows from an upper reservoir (or high pressure region) 1, across the blades and exits into a discharge region (or low pressure region) 3 after the runner and then into a draft tube (not shown of FIG. 1). The blades are mounted on a runner crown 12 under a head cover 14.

Hydroturbines can have a leakage flow (represented by arrows I and II on FIG. 1 below the head cover 14) through labyrinth seals 13, 15 (which are between rotating and stationary parts), which prevent excessive flow from going around the turbine through gaps between rotating and stationary elements, such as the runner and the head cover, or the runner and the bottom ring. Said leakage flow then flows through any space between the seal 13 and the slots or holes through which the leakage flow exits; for example it flows through a cavity 16 (see FIG. 1) and:

either exits to the main flow through balancing holes 18 (arrow I) in the crown 12, just below the intersection of the runner blade trailing edge 10 and the crown 12;

or exits through the runner crown tip (arrow II).

This leakage flow impacts the mechanical stresses, the axial thrust, and the performance of the runner.

First, in all turbines with leakage flow, performance is impacted due to the quantity of leakage flow: volumetric losses are incurred when the volume of leakage flow increases, reducing the volume of water working to generate power; in other words, more leakage flow means less water generating movement and less power output.

Second, hydrodynamic losses are also incurred because the leakage flow is returned to the main flow in such a way that it is misaligned with the main flow and disturbs the hydrodynamic flow through the turbine.

Furthermore the mechanical structure of the turbine can be affected by a high pressure in the leakage flow (in particular any space between the seal 13 and the slots or holes through which the leakage flow exits) between the runner crown 12 and the head cover 14, which causes increased forces on mechanical components such as the head cover 14 and thrust bearings. This can be due both to centrifugation of water and to the static pressure of the water in the leakage flow channel.

It is therefore a technical problem to find a new device and a new method to reduce the effects of high pressures of said leakage flow on the mechanical structure of the turbine and the disturbances of the hydrodynamic flow through the turbine.

It is also a technical problem to find a new device and a new method to guide the flow of leakage water, to improve the efficiency of the turbine.

SUMMARY OF THE INVENTION

The invention first concerns a hydraulic turbine comprising:
- blades fixed to a runner crown and to be actuated in rotation around an axis of rotation, each blade being comprised between a leading edge and a trailing edge,
- a stationary head cover and at least one passage for water, for example at least one chamber or channel, located between said runner crown and said head cover or within the head cover.

Said runner may further comprise:
- means forming at least one water passage, for example at least one hole, between said passage for water (for example: a chamber) and a chamber in the runner tip or in the lowest part of the runner crown;
- an upper portion and a lower portion of the said runner crown, said upper portion having a larger diameter than said lower portion so as to define a channel between them, said channel leading to a discharge region below the runner.

The runner tip, also called the runner cone, forms or comprises the lowest part of the runner crown, below the attachment points of the blade trailing edge.

Said channel can be circular in shape and have a circular symmetry around the axis of rotation.

A turbine according to the present invention may comprise two portions. The first (upper) portion can resemble a standard runner and crown and extends to just below the location where the runner blades are joined to the crown. The second (lower) portion can be part of the runner crown and can be shaped with a discontinuity in diameter where the lower portion has a smaller diameter than the first (upper) portion; it may leave a channel between the upper and the lower portions, the leakage water flowing through or along this channel and returning to the main flow in the discharge region.

The leakage flow can be directed by the orientation of the channel between the upper and lower crown portions and is thus well oriented with the main flow; preferably it has the same flow direction as the main flow.

The invention reduces the axial thrust on the bearings and the mechanical forces on other elements above the runner crown. Further, the invention improves the efficiency of the turbine by improving the hydrodynamics in the runner water passages.

In a preferred embodiment, support elements join said upper portion and said lower portion of said runner crown. They hold the lower crown portion in place relative to the upper crown portion. These support elements also have a directional effect that provides rotation to the leakage flow to match the main flow of water. Preferably, they are shaped such that the leakage flow is best aligned with the main flow.

Preferably said support elements guide water flowing through said channel so that water exiting said channel has the same direction as water which has flowed through the blades.

The crown tip, or the entire crown tip, comprising the lower crown portion, the support elements and part of the upper crown portion can be joined to the rest of the upper crown portion by welding, bolting or fastening by any other method.

Said at least one hole between said chamber and said runner tip is preferably cylindrical, and has an axis substantially parallel to a surface of said upper portion. But said at least one hole can also have other shapes and/or orientations relative to the surface of said upper portion.

In a preferred embodiment, there can be two positions along the rotation axis, any plane perpendicular to said axis and comprised between said two positions crossing the upper and/or the lower portions of the runner.

A hydraulic turbine according to the invention may comprise a central pipe extending from a hole in the runner shaft or from air holes located in the head cover to the tip of the crown.

The invention also concerns a method of operating a hydraulic turbine according to the invention.

In particular such method may comprise:
 flowing water through said blades, to rotate said blades around said axis of rotation;
 while flowing leakage water through said chamber, between said runner crown and said head cover, then through said at least one hole, said chamber in the runner tip and said channel, said leakage water exiting said channel and flowing into said discharge region below the runner.

Said leakage water exits said channel and flows into said discharge region with approximately the same direction as the main flow of water.

DETAILED DESCRIPTION OF SPECIFIC EMBODIMENTS

Figure 1:
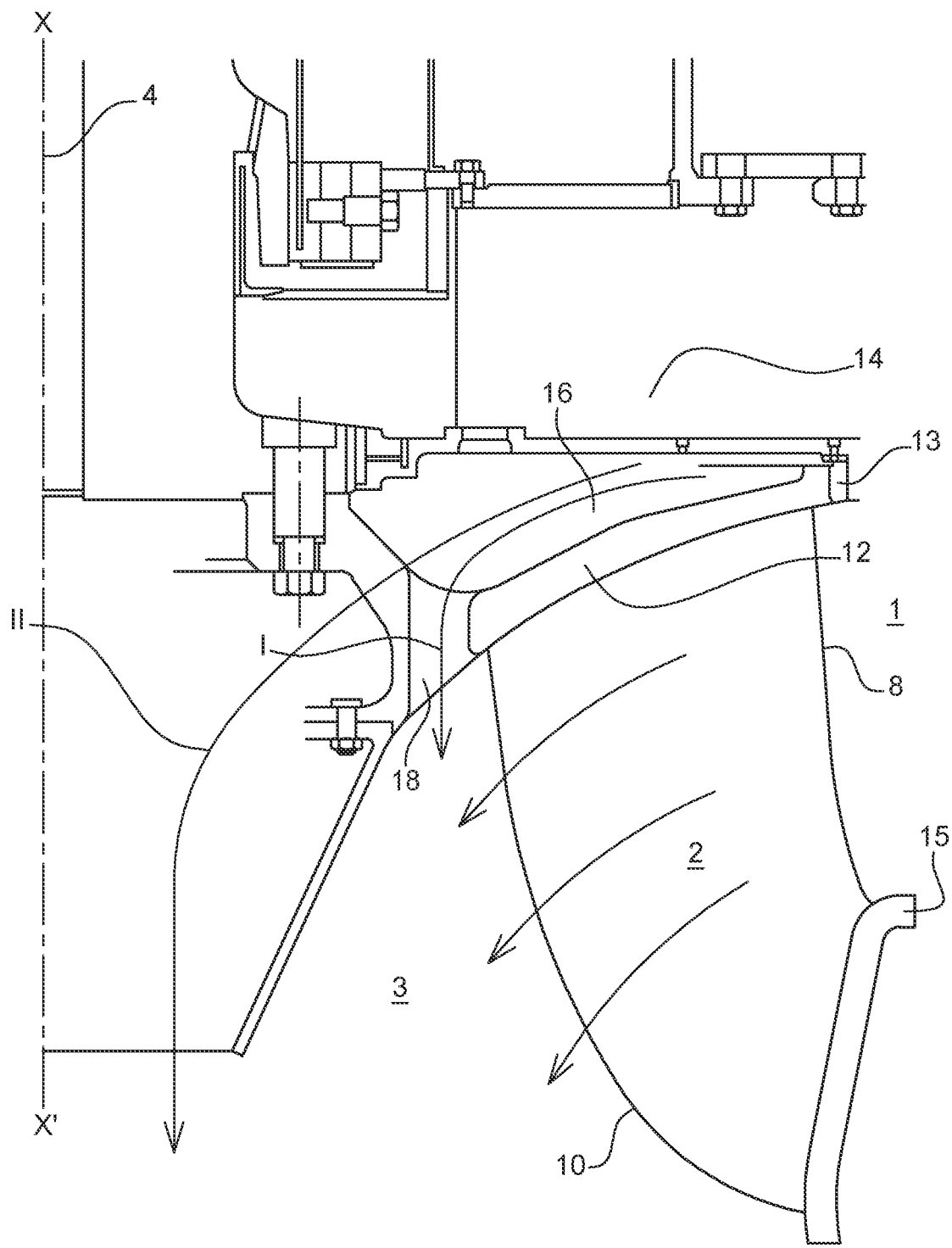
FIG. 1 shows an internal structure of a known turbine.
Figure 2A:
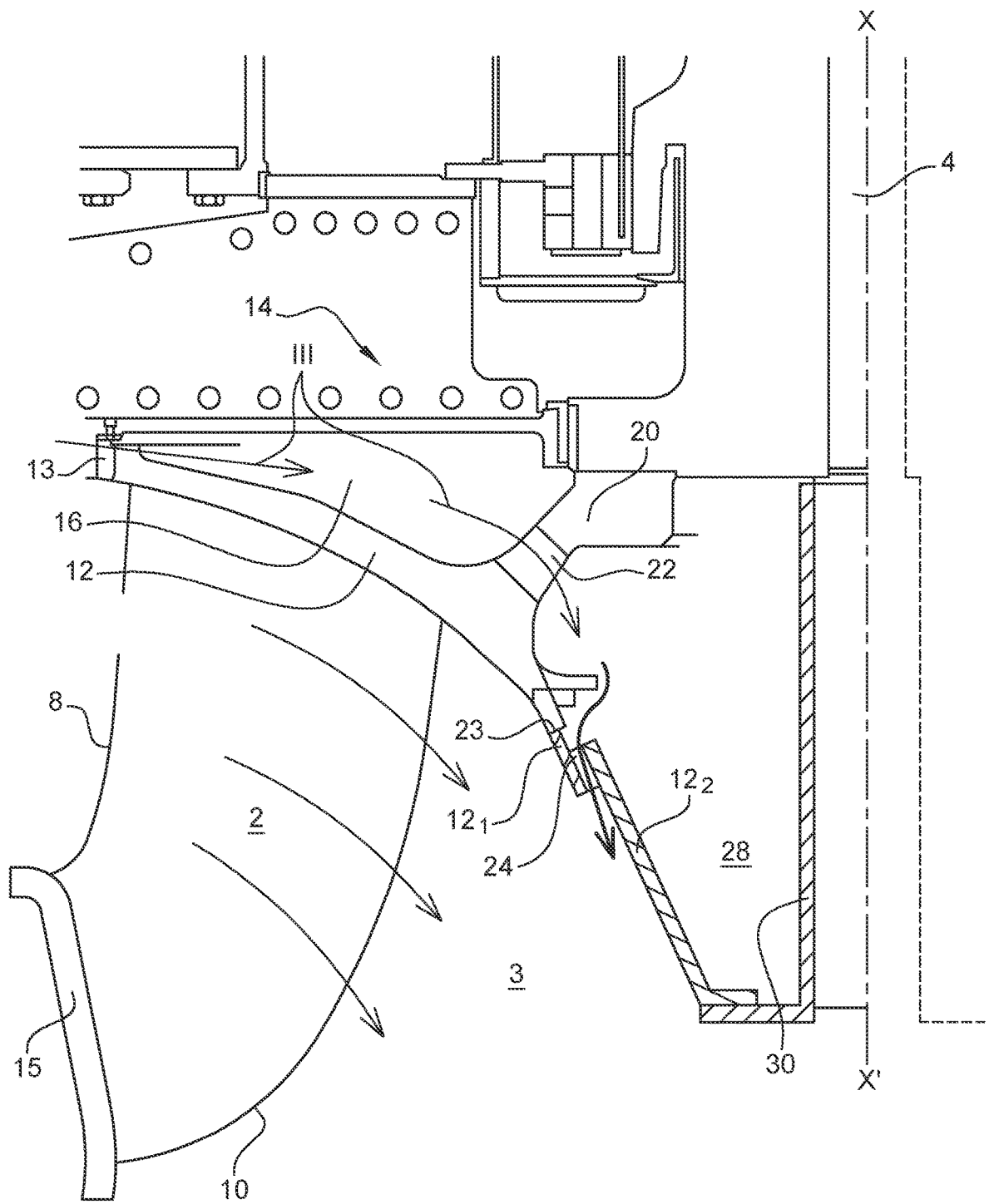
FIGS. 2A and 2B show an internal structure of a turbine according to the invention and a detailed view of the evacuation channel.

An example of an internal structure of a turbine according to the invention is illustrated on FIG. 2A, where the same reference numbers as on FIG. 1 designate the same technical elements or features.

The runner crown 12, which is attached to shaft 4 and can rotate around axis XX', has a lateral runner flange 20 in which an exit hole (or conduit or channel) 22 establishes a communication between chamber 16 (between runner crown 12 and head cover 14 or within head cover 14) and a chamber 28 inside the runner tip, which is located below the attachment points of the blade trailing edge 10 (the runner tip is also called the runner cone and forms or comprises the lowest part (along axis XX') of the runner crown); alternatively chamber 16 can be within head cover 14 and be opened, for example through a hole like exit hole 22, to chamber 28. Two examples with different chambers 16 are illustrated on FIGS. 4A and 4B.

More generally, means forming at least one passage, for example an exit hole 22 or channel of conduit, establish a hydraulic communication between:
 any passage or space, for example like chamber 16 or a channel, located between runner crown 12 and head cover 14 or located within head cover 14,
 and said chamber 28.

Arrows III indicate the direction of the leakage flow that flows through chamber 16 and below the head cover 14, then through hole 22 and the chamber 28.

The runner crown has an upper portion $12_1$ to which the runner flange 20 is connected and a lower portion $12_2$, which comprises the runner tip. The lower end $12_{1e}$ of the upper portion $12_1$ is located at a lower level (with reference to the vertical axis XX') than the upper end $12_{2e}$ of the lower portion $12_2$, so that the parts of said upper and lower portions face each other; a distance d is maintained between the lower part of the upper portion $12_1$ and the upper part of the lower portion $12_2$, so as to form a gap or a channel 24 between said upper portion $12_1$ and said lower portion $12_2$. Said channel is circular in shape and has a circular symmetry around the axis XX'.

Figure 2B:
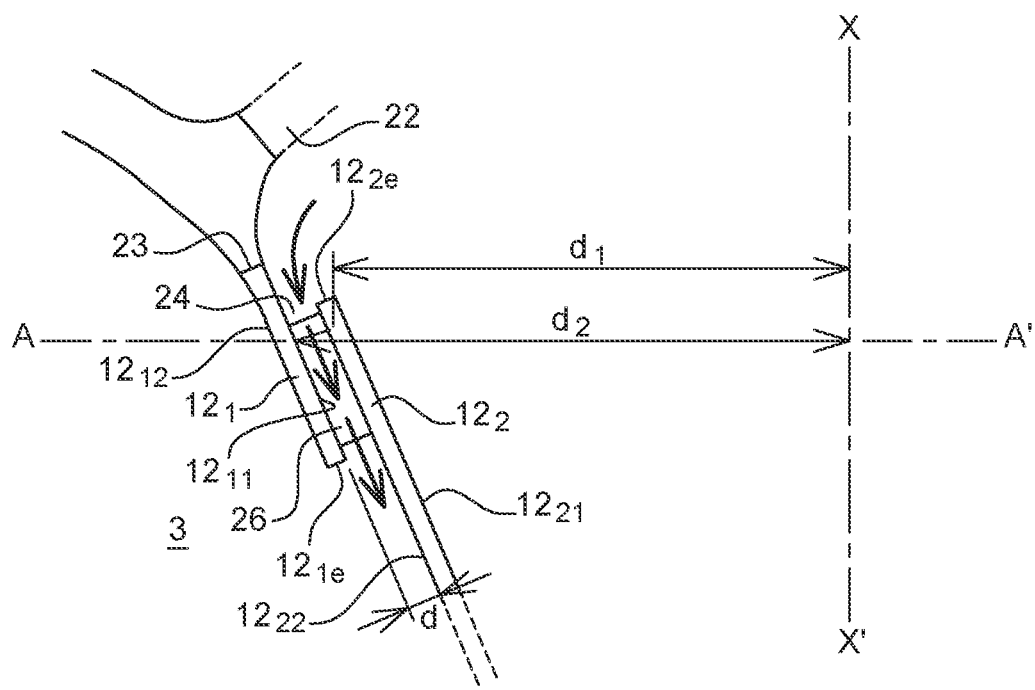

A detailed illustration of this channel 24 and of the relative position of the upper and lower portions $12_1$ and $12_2$ can be seen on FIG. 2B.

The lower portion $12_2$, which has an upper end $12_{2e}$, has a side $12_{21}$ turned toward the axis XX' of rotation of the runner and a side $12_{22}$ opposite to said axis XX' and turned to the blades 2.

The upper portion $12_1$, which has an lower end $12_{1e}$, has a side $12_{11}$ turned toward the axis XX' of rotation of the runner and partly to lower portion $12_2$ and a side $12_{12}$ opposite to said axis XX' and facing the blades 2.

The channel 24 defined between the upper portion $12_1$ and the lower portion $12_2$ extends between side $12_{22}$ of the lower portion $12_2$ and side $12_{11}$ of the upper portion $12_2$.

The surfaces of the different sides $12_{21}$, $12_{22}$, $12_{11}$, $12_{12}$ are substantially parallel to each other: channel 24 thus guides water in a direction substantially identical to the direction of water which exits from the blades to the discharge region 3 (which is also a low pressure region).

In any plane AA' (FIG. 2B) perpendicular to the rotation axis XX' of the runner and located between the lower end $12_{1e}$ of the upper portion and the upper end $12_{2e}$ of the lower portion, the distance $d_1$ between axis XX' and the side $12_{22}$ of the lower portion $12_2$ is smaller than the distance $d_2$ between axis XX' and side $12_{11}$ of the upper portion $12_1$.

The hole 22 which connects said chamber 16 and said runner tip is preferably cylindrical with a cylindrical axis which can be substantially parallel to the surface $12_{12}$ of the upper portion $12_1$ of the runner crown; a cylindrical hole offers the advantage of easier machining.

The upper portion $12_1$ and the lower portion $12_2$ of the runner crown are maintained at distance d (width of channel 24) from each other by support structures 26 (or ribs or stiffeners) used both to mechanically join the upper and lower portions and to direct the leakage flow so that it has a direction at least partially aligned with the main flow of water; since the ribs are in rotation like the runner crown, they also have a rotational effect on the leakage flow; they can be hydro-dynamically shaped and oriented to the flow.

Figure 3:
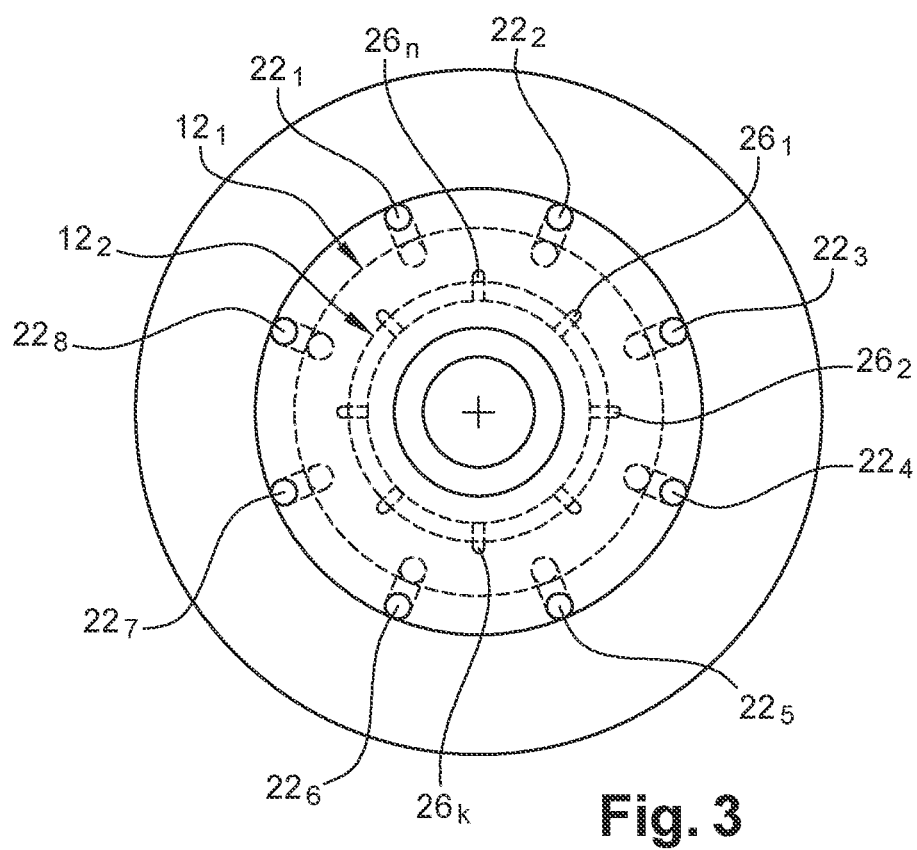
FIG. 3 shows a top view of a turbine according to the invention.

Only one hole 22 and one rib 26 are represented on FIGS. 2A and 2B. But the device, including said channel 24, has a circular symmetry around axis XX' and a plurality of such holes, preferably regularly spaced from each other, and a plurality of ribs are located around axis XX': FIG. 3 is a top view of part of the runner and of the upper $12_1$ and of the lower $12_2$ portions of the runner crown; several holes $22_1$-$22_6$ are also represented on this figure (all having the technical function of hole 22 on FIG. 2A), as well as several support structures $26_1$-$26_n$ (which, on the top view, are located under the lower portion $12_2$).

In this example, the support structures 26 are essentially straight metal sections but can have any other direction and/or orientation and/or curvature to orient the flow of water exiting channel 24 in a direction as close as possible to that of the main water flow at a specific operating point (which flows through the blades 2 and then to the low pressure region 3).

Leakage water flows through chamber 16, then exits this chamber through hole 22 and enters chamber 28 and leaves chamber 28 through channel 24. Water is forced to leave the chamber due to the pressure difference between the inlet upstream section (in chamber 16) and the discharge region 3 below the runner. In cavity 28, water is also subject to centrifugal force and thus forced against wall 12$_{11}$, from which it can exit through channel 24.

As illustrated on FIGS. 2A and 2B, there can be a junction 23 (obtained by welding, bolting or fastening by any other method) between:
the crown tip, or the entire crown tip, comprising the lower crown portion 12$_2$, the support element(s) 26 and part of the upper crown portion 12$_1$;
and the rest of the upper crown portion 12$_1$.

In other words, an assembly is made comprising the crown tip (including the entire lower portion), the support structure (s) 26 and part of the upper crown. This assembly can then be fastened to the upper crown portion.

Figure 4A:
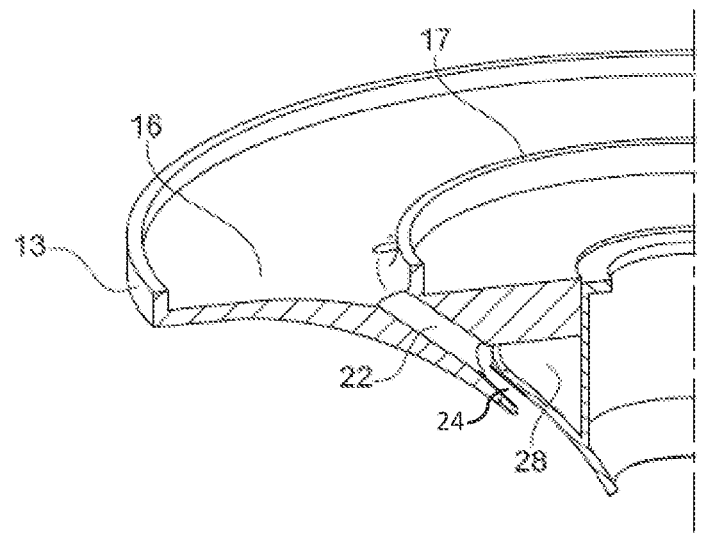
FIGS. 4A and 4B are perspective partial views of runners according to particular embodiments of the invention.

A perspective partial view of a runner according to a particular embodiment of the invention is shown on FIG. 4A. Chamber 16 is located between labyrinth seal 13 and an intermediate labyrinth seal 17 (which is a seal at an intermediate radius between the stationary head cover and the rotating upper crown).

Figure 4B:
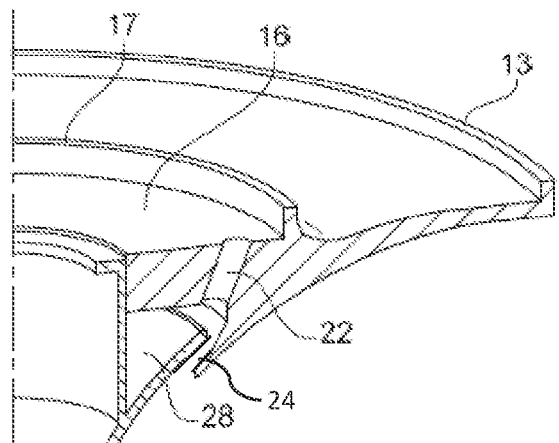

Another perspective partial view of a runner according to another particular embodiment of the invention is shown on FIG. 4B. Chamber 16 is located above the upper crown, including passages in the head cover, between the intermediate labyrinth seal 17 and the central shaft.

In both examples of FIGS. 4A and 4B reference 22 designates a conduit or a channel establishing communication between said chamber 16 and chamber 28.

Unlike the prior art structures (in which the leakage flow exits the crown at an angle to the main flow (see FIG. 1, arrow I), disrupting the hydrodynamics of the runner and increasing losses) the leakage flow in a runner according to the invention exits the runner crown and is already quite well aligned with the main flow, thus reducing losses. In this invention, the exit of passages 24 are at a radius larger than the radius of the runner tip and similar to the radius of the prior art structures (see FIG. 1, arrow II). This feature reduces the pressure in chambers 28 and 16, reducing mechanical stresses and axial thrust on the runner.

In addition, the chamber 28 inside the runner tip has a low pressure very close to the pressure in the discharge region 3 below the runner. Below the runner, the pressure is close to constant. If the holes through which the leakage flow exits to the discharge region 3 are at a small radius (close to axis XX'), the pressure at this location will be the pressure below the runner. As the radius increases, centrifugation will increase the pressure. If the holes are at a larger radius, the pressure will be the pressure below the runner at this larger radius. Centrifugation still increases the pressure, but the pressure will be lower than if the leakage flow exits the runner at a smaller radius.

Figure 5:
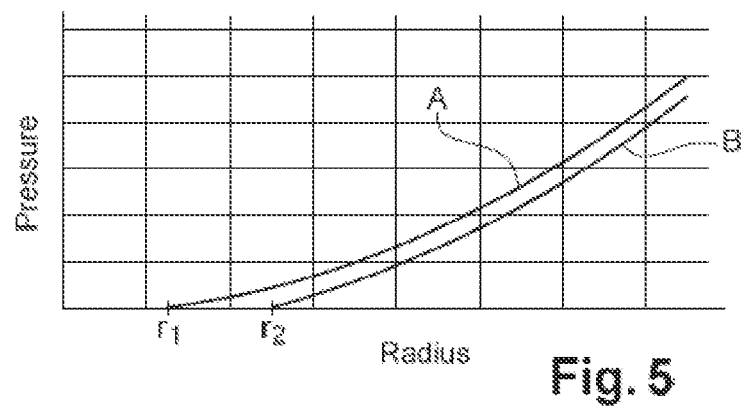
FIG. 5 shows the variation of pressure with radius and with centrifugation.

This is illustrated on FIG. 5, which shows the dependence of the pressure on the radius, both for a discharge flow released at runner tip (curve A) and for a discharge flow released from the channel 24 according to the invention (curve B). The pressure below the runner is essentially constant, independent of radius. The pressure from the starting point (small radius $r_1$ for runner tip, intermediate radius $r_2$ for the channel 24) is the same. Centrifugation causes an increase in pressure. Since the starting pressure at the larger radius $r_2$ is the same as the starting pressure at the smaller radius $r_1$, the pressure above the runner with the smaller radius leakage flow exit (curve A) is higher than the pressure above the runner with the larger radius leakage flow exit (curve B).

In other words, centrifugation causes the pressure to increase with radius, but since the radius of the exit of channel 24 is larger than the radius of the runner tip, the pressure in chamber 16 between the head cover 14 and the runner crown 12 is reduced with respect to the configuration of the prior art in which the leakage flow is released through the runner tip; this, in turn, reduces the load on mechanical components, increasing lifetime of the turbine and other components and allowing the use of smaller, less expensive components. In the case of turbine rehabilitations, the lower pressures can result in reuse of an existing component rather than replacement. An additional central pipe 30 can be added extending from the hole in the runner shaft to the crown tip such that air can be injected into the flow as required without impact on the leakage flow.

The invention claimed is:

1. A hydraulic turbine, comprising:
a runner having a shaft, a runner crown, and a runner tip;
blades fixed to the runner crown and rotatable around an axis of rotation in operation of the hydraulic turbine, each blade comprising a leading edge and a trailing edge;
a stationary head cover;
a first chamber located between the runner crown and the head cover or within head cover;
a second chamber located in the runner tip;
at least one passage for water defined between the first chamber and the second chamber;
the runner crown comprising an upper portion and a lower portion, the upper portion having a larger diameter than the lower portion such that a channel is defined between the upper and lower portions;
wherein the channel comprises a circular shape and a circular symmetry around the axis of rotation and leads to a discharge region below the runner; and
support structures joining the upper and lower portions of the runner crown.

2. The hydraulic turbine according to claim 1, wherein the passage is formed by at least one of a hole, a channel, or a conduit.

3. The hydraulic turbine according to claim 1, wherein the support structures are configured such that water flowing through and exiting the channel has a same direction as water that has flowed through the blades.

4. The hydraulic turbine according to claim 1, wherein the passage is formed by at least one cylindrical hole between the first chamber and the second chamber, the hole comprising an axis substantially parallel to a surface of the upper portion of the runner crown.

5. The hydraulic turbine according to claim 1, further comprising a central pipe extending from a hole in the runner shaft to runner tip.

6. A method of operating the hydraulic turbine according to claim 1, comprising:
flowing water through the blades to rotate the blades around the axis of rotation;
simultaneously flowing leakage water from the first chamber through the passage and into the second chamber;
flowing the leakage water from the second chamber through the channel between the upper and lower portions of the runner crown such that the leakage water exits the channel and flows into the discharge region below the runner.

\* \* \* \* \*